(12) United States Patent
Buck et al.

(10) Patent No.: US 10,006,827 B2
(45) Date of Patent: Jun. 26, 2018

(54) PIEZOELECTRIC PRESSURE SENSOR AND PROCESS OF MANUFACTURING SAME

(71) Applicant: KISTLER HOLDING AG, Winterthur (CH)

(72) Inventors: Reinhold Buck, Illnau (CH); Martin Giger, Winterthur (CH)

(73) Assignee: KISTLER HOLDING AG, Winterthur (CH)

( * ) Notice: Subject to any disclaimer, the term of this patent is extended or adjusted under 35 U.S.C. 154(b) by 225 days.

(21) Appl. No.: 15/215,712

(22) Filed: Jul. 21, 2016

(65) Prior Publication Data

US 2017/0030791 A1  Feb. 2, 2017

(30) Foreign Application Priority Data

Jul. 31, 2015 (EP) .................................. 15179379

(51) Int. Cl.
*G01L 9/00* (2006.01)
*G01L 9/08* (2006.01)
(Continued)

(52) U.S. Cl.
CPC ............ *G01L 23/10* (2013.01); *B23K 1/0016* (2013.01); *B23K 20/02* (2013.01); *B23K 20/023* (2013.01);
(Continued)

(58) Field of Classification Search
CPC ......... G01L 9/00; G01L 9/0052; G01L 9/008; G01L 9/08; G01L 19/00; G01L 19/0069; G01L 19/0084; G01L 19/04; G01L 19/06; G01L 19/0672; G01L 19/14; G01L 19/148; G01L 23/00; G01L 23/10; G01L 23/22;
(Continued)

(56) References Cited

U.S. PATENT DOCUMENTS 3,158,763 A * 11/1964 Busch .................... G01L 23/10
310/338
3,364,368 A    1/1968 Sonderegger
(Continued)

FOREIGN PATENT DOCUMENTS

DE     3423711 A1    1/1985
DE    199 36 300 A1  2/2000
(Continued)

OTHER PUBLICATIONS

EP Search Report (16178284.2, dated Nov. 9, 2016.
EP Search Report, dated Jan. 5, 2016.

*Primary Examiner* — Nguyen Ha
(74) *Attorney, Agent, or Firm* — Dority & Manning, P.A.

(57) ABSTRACT

A piezoelectric pressure sensor includes a membrane for detecting a pressure profile, a piezoelectric sensor on which polarization charges are produced by the detected pressure profile, an electrode arrangement receiving and transmitting the generated polarization charges as signals via a charge output. The sensor further includes an electrical connecting element and an electrical signal conductor. The electrical connecting element is electrically and mechanically connected to the electrical signal conductor. The charge output is connected to the electrical connecting element in certain areas and transmits signals through the electrical connecting element into the electrical signal conductor.

15 Claims, 8 Drawing Sheets

(51) Int. Cl.
    *G01L 19/06*     (2006.01)
    *G01L 19/14*     (2006.01)
    *G01L 23/10*     (2006.01)
    *G01L 23/22*     (2006.01)
    *G01M 15/08*     (2006.01)
    *G01L 19/00*     (2006.01)
    *G01L 19/04*     (2006.01)
    *B23K 1/00*     (2006.01)
    *B23K 20/02*     (2006.01)

(52) U.S. Cl.
    CPC .......... *G01L 9/008* (2013.01); *G01L 19/0069* (2013.01); *G01L 19/04* (2013.01); *G01L 19/148* (2013.01); *G01M 15/08* (2013.01)

(58) Field of Classification Search
    CPC ..... G01M 15/08; B23K 1/0016; B23K 20/02; B23K 20/023
    See application file for complete search history.

(56) References Cited

U.S. PATENT DOCUMENTS

| | | | | |
|---|---|---|---|---|
| 3,461,327 A | * | 8/1969 | Zeiringer | G01L 9/008 310/338 |
| 3,495,102 A | * | 2/1970 | List | G01L 23/10 310/338 |
| 3,960,018 A | | 6/1976 | Change et al. | |
| 4,645,965 A | | 2/1987 | Paganelli | |
| 2010/0263451 A1 | * | 10/2010 | Friedl | G01L 23/10 73/723 |
| 2016/0299024 A1 | * | 10/2016 | Yamada | G01L 7/082 |
| 2017/0130650 A1 | * | 5/2017 | Takahashi | F02B 77/085 |

FOREIGN PATENT DOCUMENTS

| | | | | |
|---|---|---|---|---|
| GB | 1142983 A | * | 2/1969 | ............... G01L 1/16 |
| GB | 1207562 A | * | 10/1970 | ............... G01L 1/16 |
| GB | 2 022 261 A | | 12/1979 | |
| WO | WO 2013/147260 A1 | | 10/2013 | |
| WO | WO 2015/092997 | | 6/2015 | |

\* cited by examiner

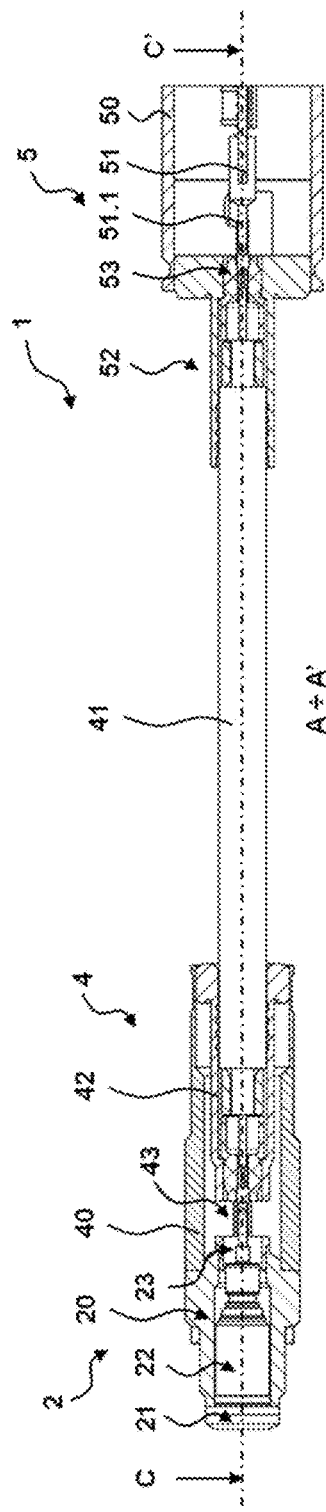
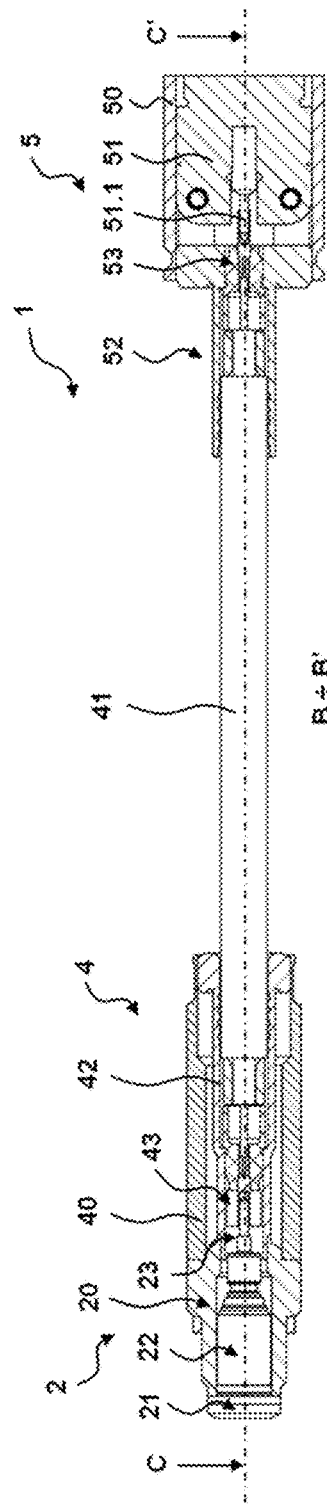
Fig. 1
Fig. 2

PIEZOELECTRIC PRESSURE SENSOR AND PROCESS OF MANUFACTURING SAME

FIELD OF THE INVENTION

The invention relates to piezoelectric pressure sensors and a process of manufacturing piezoelectric pressure sensors.

BACKGROUND

Piezoelectric pressure sensors are known and are widely used. Thus, they are used in pressure indexing of internal combustion engines to detect a cylinder pressure prevailing in a pressure chamber as a function of the crankshaft position or a time. Among the different types of internal combustion engines are four-stroke engines and two-stroke engines such as gasoline engines, diesel engines, Wankel engines, etc. In marine diesel engines, piezoelectric pressure sensors are used for long-term monitoring of a cylinder pressure. Piezoelectric pressure sensors are used to monitor fast pressure profiles that usually are in the range of 150 to 250 bar but including pressure peaks of 500 bar and higher if pre-ignition and engine knocking occur. However, piezoelectric pressure sensors also can be used in pressure monitoring in jet engines, gas turbines, steam turbines, steam engines, etc.

U.S. Pat. No. 3,364,368, which is hereby incorporated herein by this reference for all purposes, discloses a piezoelectric pressure sensor that includes a membrane that protrudes directly into the pressure chamber through a bore of the pressure chamber. An edge of the membrane is welded to a housing of the piezoelectric pressure sensor. The pressure profile captured by the membrane acts onto a piezoelectric sensor, which is arranged within the housing in the proximity of the membrane. The pressure profile generates electric polarization charges on the piezoelectric sensor, and these charges are transmitted as signals via an electrode. The magnitudes of the signals are proportional to the magnitudes of the pressure profiles. The electrode is arranged on the piezoelectric sensor. By means of an electrical conductor, the signals are transmitted from the electrode to a socket for a plug connection of a signal cable to an evaluation unit. The socket is arranged on a side of the housing that faces away from the membrane.

The piezoelectric sensor is mechanically pre-stressed via a pre-stressing sleeve. With respect to construction, this is achieved by a circular-symmetrical construction of the piezoelectric pressure sensor. The housing is cylindrical in shape. The membrane is frontally attached to the housing, and to the rear, the piezoelectric sensor is arranged along a longitudinal axis of the housing. The electrical conductor extends centrally through the piezoelectric sensor and the housing. In the direction of the longitudinal axis, the pre-stressing sleeve is arranged radially outward of the piezoelectric sensor. A rear end of the pre-stressing sleeve is welded to the housing, while a front end of the pre-stressing sleeve is welded to the membrane. Thus, the pre-stressing assembly seals the piezoelectric sensor against the socket in a vacuum-tight and pressure-tight manner.

However, during use of the piezoelectric pressure sensor, the plug connection between the socket and the signal cable is permanently exposed to strong engine vibrations and high temperatures of 200° C. and above, and this exposure may lead to micro friction and fretting corrosion of the electrical plug contacts. In addition, outgassing of the signal cable sheath may occur at high temperatures, leading to friction polymerization at the electrical plug connection. Furthermore, diffusion of base metals to a contact surface of the electrical plug contacts may occur in the plug connection at high temperatures, leading to build-up of an oxide layer that is present in this area. These effects can occur separately or in combination. As a result, the electrical contact resistance of the electrical plug contacts may change. Thus, the electrical contact resistance may increase from the m$\Omega$ range by several orders of magnitude into the M$\Omega$ range and distort the signals transmitted to the evaluation unit, resulting in incorrect signal evaluations.

It is a first object of the invention to provide a piezoelectric pressure sensor wherein signal distortion in the signal output is effectively prevented. It is another object of the present invention to provide a piezoelectric pressure sensor wherein the signal output additionally is mechanically stable. Another object of the invention is to provide a process for cost-effective manufacturing of a piezoelectric pressure sensor. These and other objects desirably are achieved by the features described more fully below.

SUMMARY OF THE INVENTION

The invention relates to a piezoelectric pressure sensor that includes a membrane that captures a pressure profile; a piezoelectric sensor on which polarization charges are generated by the captured pressure profile; an electrode arrangement receiving and transmitting the generated polarization charges in the form of signals via a charge output; and an electrical connecting element and an electrical signal conductor, which electrical connecting element is electrically and mechanically connected to the electrical signal conductor; wherein the charge output is zonally connected by means of material bonding to the electrical connecting element and transmits signals via the electrical connecting element into the electrical signal conductor.

The connection between the charge output and the electrical connecting element inhibits the occurrence of micro friction, fretting corrosion, friction polymerization or build-up of an oxide layer between the contact surfaces of the electrical plug contacts during use of the piezoelectric pressure sensor, and accordingly effectively prevents distortion of the signals.

The invention also relates to a process for the manufacture of such a piezoelectric pressure sensor. In this process, a sensor assembly is provided as a semi-finished product, and this sensor assembly includes a membrane, a piezoelectric sensor and an electrode arrangement having a charge output; wherein an electrical connecting element of a signal cable assembly or of an evaluation unit is provided. The charge output is zonally connected to the electrical connecting element, and a material bond is made between the charge output and the electrical connecting element.

Thus, by means of the material bond between the charge output of the sensor assembly and the electrical connecting element, a piezoelectric pressure sensor is achieved. This enables a combination of variations of the sensor assembly with variations of the signal cable assembly or a combination of variations of the sensor assembly directly with the evaluation unit, thereby forming a piezoelectric pressure sensor. Thus, from a small number of semi-finished products consisting of equivalent parts, a variety of different piezoelectric pressure sensors can be produced, and this flexibility makes the manufacture thereof very cost-effective.

BRIEF DESCRIPTION OF THE DRAWINGS

In the following, the invention will be explained in more detail by way of examples referring to the Figures in which:

FIG. 1 shows a first section A÷A' through a piezoelectric pressure sensor with sensor assembly, signal cable assembly and evaluation unit;

FIG. 2 shows a second section B÷B' through the piezoelectric pressure sensor with sensor assembly, signal cable assembly and evaluation unit according to FIG. 1;

DESCRIPTION OF EXEMPLARY EMBODIMENTS OF THE INVENTION

Figure 10:
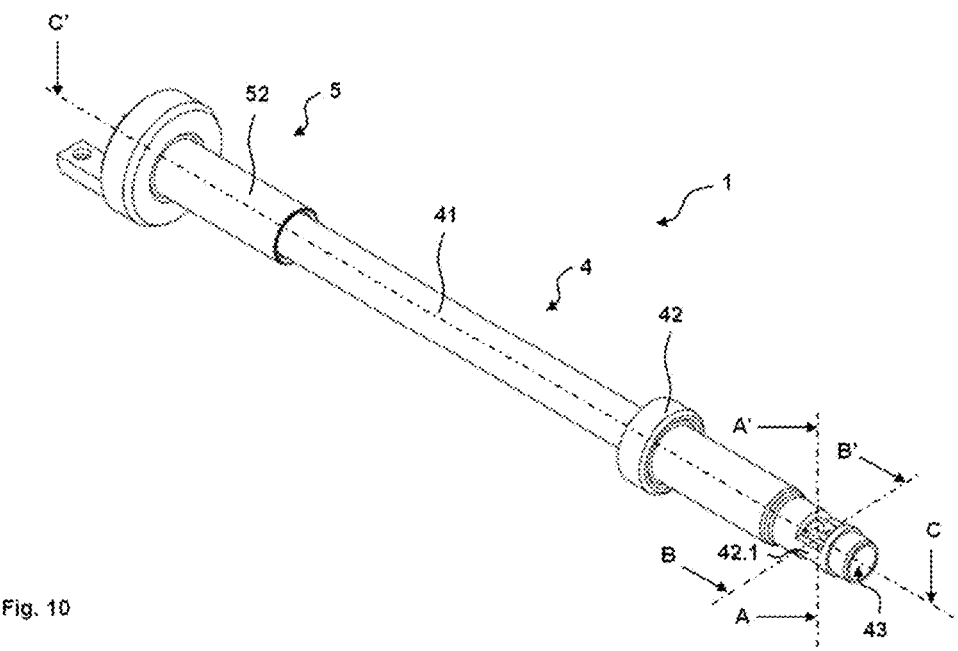
FIG. 10 shows a perspective view of a portion of the piezoelectric pressure sensor according to FIGS. 1, 2 and 7 to 9.
Figure 11:
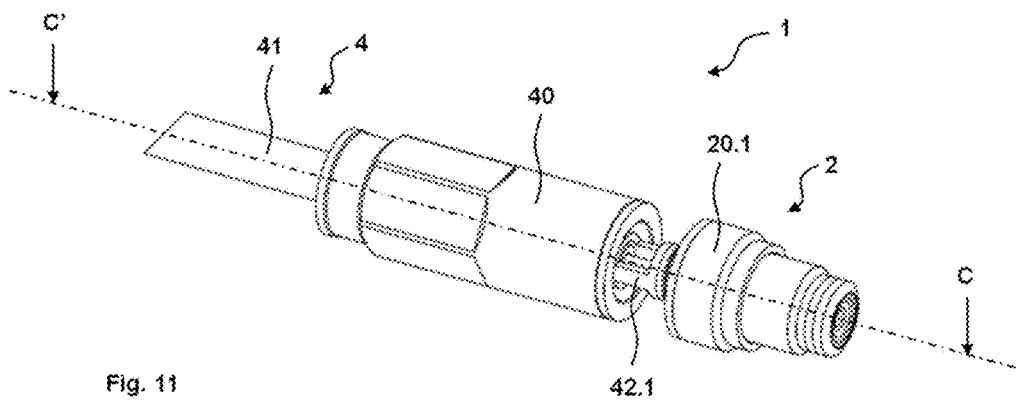
FIG. 11 shows a perspective view of a portion of the piezoelectric pressure sensor according to FIGS. 1 to 10 prior to mechanical connection of the sensor assembly to the signal cable assembly.
Figure 12:
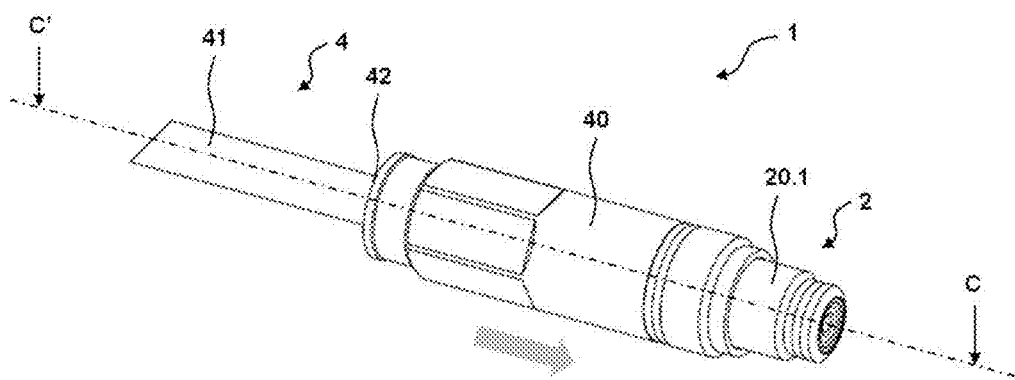
FIG. 12 shows a perspective view of a portion of the piezoelectric pressure sensor according to FIG. 11 after the mechanical connection of the charge output of the sensor assembly to the signal cable assembly has been made.

FIGS. 1 and 2 show sections through the piezoelectric pressure sensor 1 according to the invention in which the three orthogonal axes are the vertical axis AA', the horizontal axis BB' and the longitudinal axis CC'. The sections in FIGS. 1-8 are shown along a longitudinal axis CC' of the mounted ready-to-use piezoelectric pressure sensor 1. FIG. 1 is a full sectional view taken in a plane with a vertical axis AA' of the piezoelectric pressure sensor 1 serving as the sectional line A÷A'. FIG. 2 is a full sectional view taken in a plane with a horizontal axis BB' of the piezoelectric pressure sensor 1 serving as a sectional line B÷B'. The vertical axis AA' and the horizontal axis BB' are perpendicular to one another. As shown in FIGS. 10-12 for example, the piezoelectric pressure sensor 1 and its components are generally cylindrical with respect to the longitudinal axis CC'. Thus, in a cross sectional view taken in a plane that shows the vertical axis AA' and the horizontal horizontal axis BB', and thus is a plane to which the longitudinal axis CC' oriented, the outwardly facing surfaces of the piezoelectric pressure sensor 1 and its components are generally circular. The adverb "generally" includes a variation from the circular form of ±10%. Knowing the present invention, the piezoelectric pressure sensor and its components also may be formed with their outwardly facing surfaces taking on shapes that are rectangular, polygonal, etc. in cross section.

The components of the piezoelectric pressure sensor 1 may be mechanically contacted with each other or may be mechanically connected to each other. In the sense of the invention, a mechanical contact means that several components are merely placed in a direct contact to one another, while in the case of a mechanical connection several components are attached to each other by means of material bonding, force closure or form closure. Thus, a mechanical contact is not necessarily a mechanical connection. A mechanical contact is not pressure-tight. The adjective "pressure-tight" refers to resistance against pressure profiles of 10 bar and more. By material bonding is meant connection effected by soldering or welding for example. By form closure is meant positive fit joints such as by bolted joints or snap joints that are intended to be reversible without damaging either of the joined elements. By force closure is meant a force fit joint between two elements in contact with each other that requires the application of force to at least one of the elements by a tool in order to effect the connection such as screwed joints or riveted joints or press-fit joints, and while these are in some sense reversible, there might be damage done by the actions required for separation of the two elements. Another type of force closure would be joints held together by magnetic force attraction, yet these could be separated without damaging either of the joined elements.

As shown in FIGS. 1 and 2 for example, in accordance with the present invention, embodiments of a piezoelectric pressure sensor 1 include a sensor assembly 2, a signal cable assembly 4 and an evaluation unit 5. The 2 sensor assembly is electrically and mechanically connected to the evaluation unit 5 either by the signal cable assembly 4 or it is directly electrically and mechanically connected to the evaluation unit 5.

As shown in FIGS. 1 and 2 for example, an embodiment of the sensor assembly 2 is arranged in a front area of the piezoelectric pressure sensor 1 and includes a sensor housing assembly 20, a membrane 21, a piezoelectric sensor 22 and an electrode arrangement 23. The piezoelectric pressure sensor 1 is intended to be mechanically connected to a wall (not shown) of a pressure chamber (not shown), and when so connected the membrane 21 protrudes directly into the pressure chamber through a bore. The mechanical connection desirably can be made through force closure or form closure. During use of the piezoelectric pressure sensor 1, the front area of the piezoelectric pressure sensor 1 is permanently exposed to strong engine vibrations and high temperatures in the vicinity of the pressure chamber. The terms "front" and "rear" are used for the piezoelectric pressure sensor 1 and its components to indicate by "front" an area that is oriented towards the membrane 21, while "rear" refers to an area that faces away from the membrane 21.

The signal cable assembly 4 and the evaluation unit 5 are disposed in an area of the surroundings of piezoelectric pressure sensor 1 that is adjacent to its front area. In the surroundings of the pressure chamber, the pressure is atmospheric pressure and there are people in ambient air. As shown in FIGS. 1 and 2 for example, an embodiment of the signal cable assembly 4 includes a connection element housing 40, a signal cable 41, a supporting body 42 and an electrical connecting element 43. More details regarding the signal cable assembly 4 will be described below in the description of FIGS. 7 to 12. The evaluation unit 5 includes an electrical circuit board 51 accommodated in a circuit board housing 50, a supporting body 52 and an electrical connecting element 53. More details with respect to the evaluation unit 5 will be described below in the description of FIGS. 9 to 12.

Figure 7:
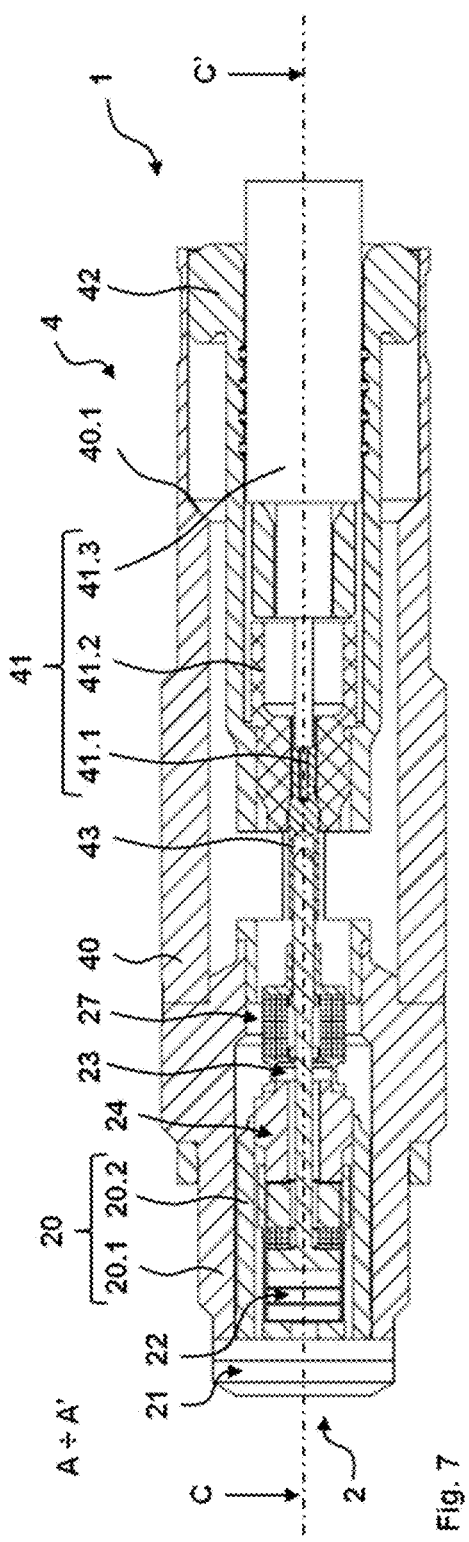
FIG. 7 shows a longitudinal section C÷C' of a portion of the piezoelectric pressure sensor according to FIG. 1 taken through a vertical plane A÷A'.
Figure 8:
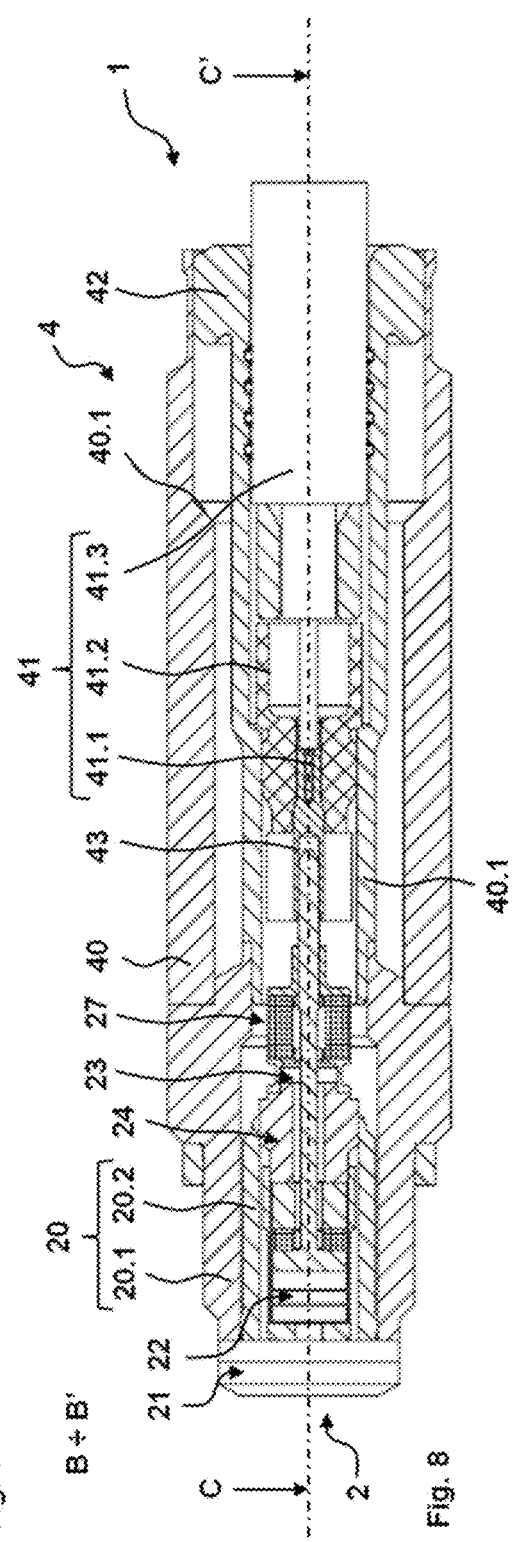
FIG. 8 shows a longitudinal section C÷C' of a portion of the piezoelectric pressure sensor according to FIG. 2 taken through a horizontal plane B÷B'.

As shown in FIGS. 7 and 8 for example, an embodiment of the sensor housing assembly 20 of the sensor assembly 2 desirably can include a sensor housing 20.1 and a reinforcement casing 20.2. The reinforcement casing 20.2 prevents the transfer of mechanical tensions originating from the mechanical connection of the piezoelectric pressure sensor 1 to the wall of the pressure chamber, said mechanical tensions being transmitted via the sensor housing assembly 20 onto the piezoelectric sensor 22 and disturbing the detection of the pressure profile as well as distorting the signals. Sensor housing 20.1 and reinforcement casing 20.2 desirably include mechanically flexible material such as pure metals, nickel alloys, cobalt alloys, iron alloys, etc. and are mechanically connected to each other. The mechanical connection desirably can be achieved by means of material bonding such as welding, diffusion welding, thermo compression bonding, soldering, etc. Knowing the present invention, the skilled person also can manufacture the sensor assembly without a reinforcement casing 20.2, and in such an alternative embodiment, the sensor assembly 2 only includes a sensor housing 20.1.

FIGS. 3 to 6 show enlarged sections through several embodiments of the sensor assembly 2 of the piezoelectric pressure sensor 1 according to FIG. 1 or 2. The frontal membrane 21 desirably includes mechanically flexible material such as pure metals, nickel alloys, cobalt alloys, iron alloys, etc. An edge of the membrane 21 is mechanically connected around its entire perimeter to the reinforcement casing 20.2. The mechanical connection desirably is carried out by means of material bonding such as welding, diffusion welding, thermo compression bonding, soldering, etc. With respect to the longitudinal axis CC', the piezoelectric sensor 22 is positioned directly behind the membrane 21 and symmetrically with respect to the longitudinal axis CC'. Accordingly, a pressure captured by the membrane 21 is a pressure that impinges on the front side of the membrane 21 and acts as a normal force onto the piezoelectric sensor 22.

Figure 3:
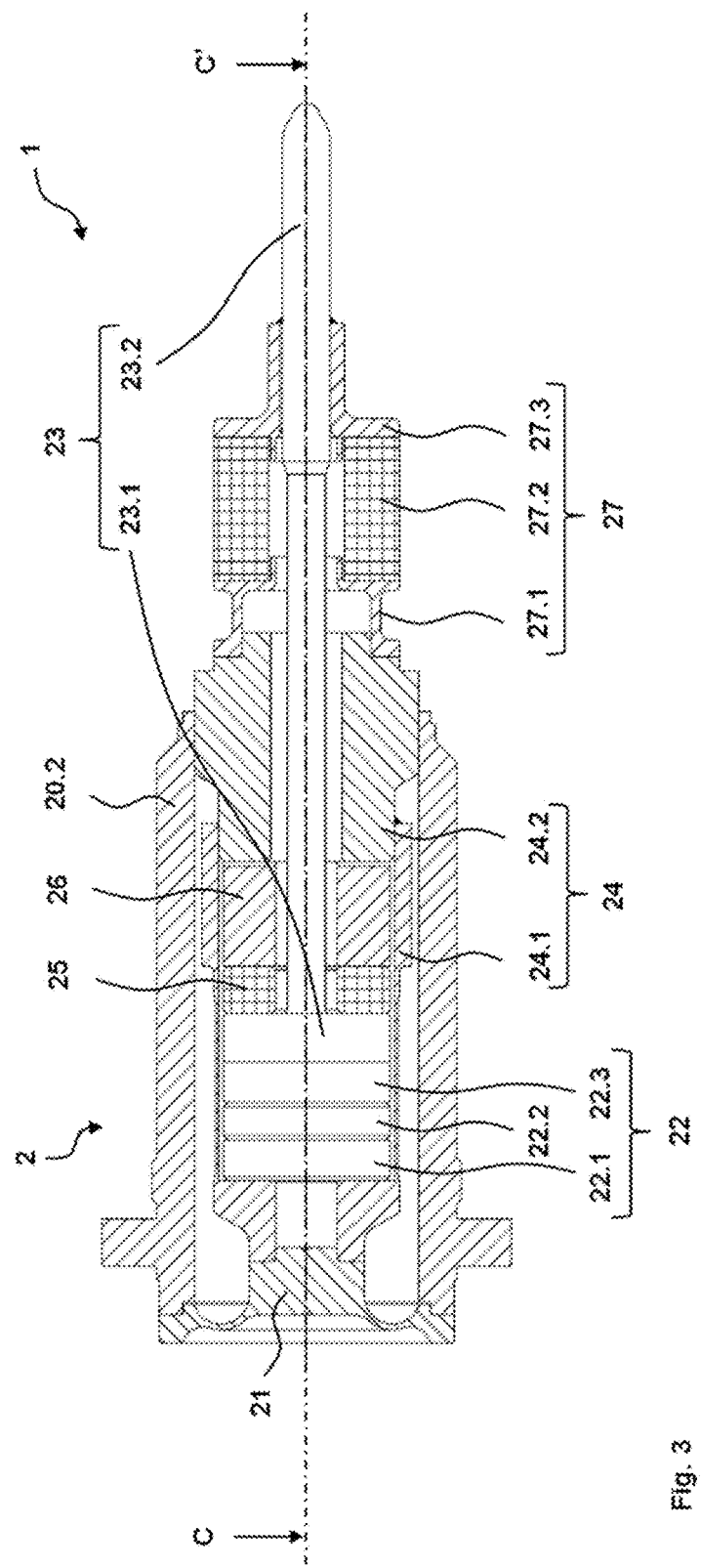
FIG. 3 shows a section C÷C' through a first embodiment of the sensor assembly according to FIG. 1 or 2.
Figure 4:
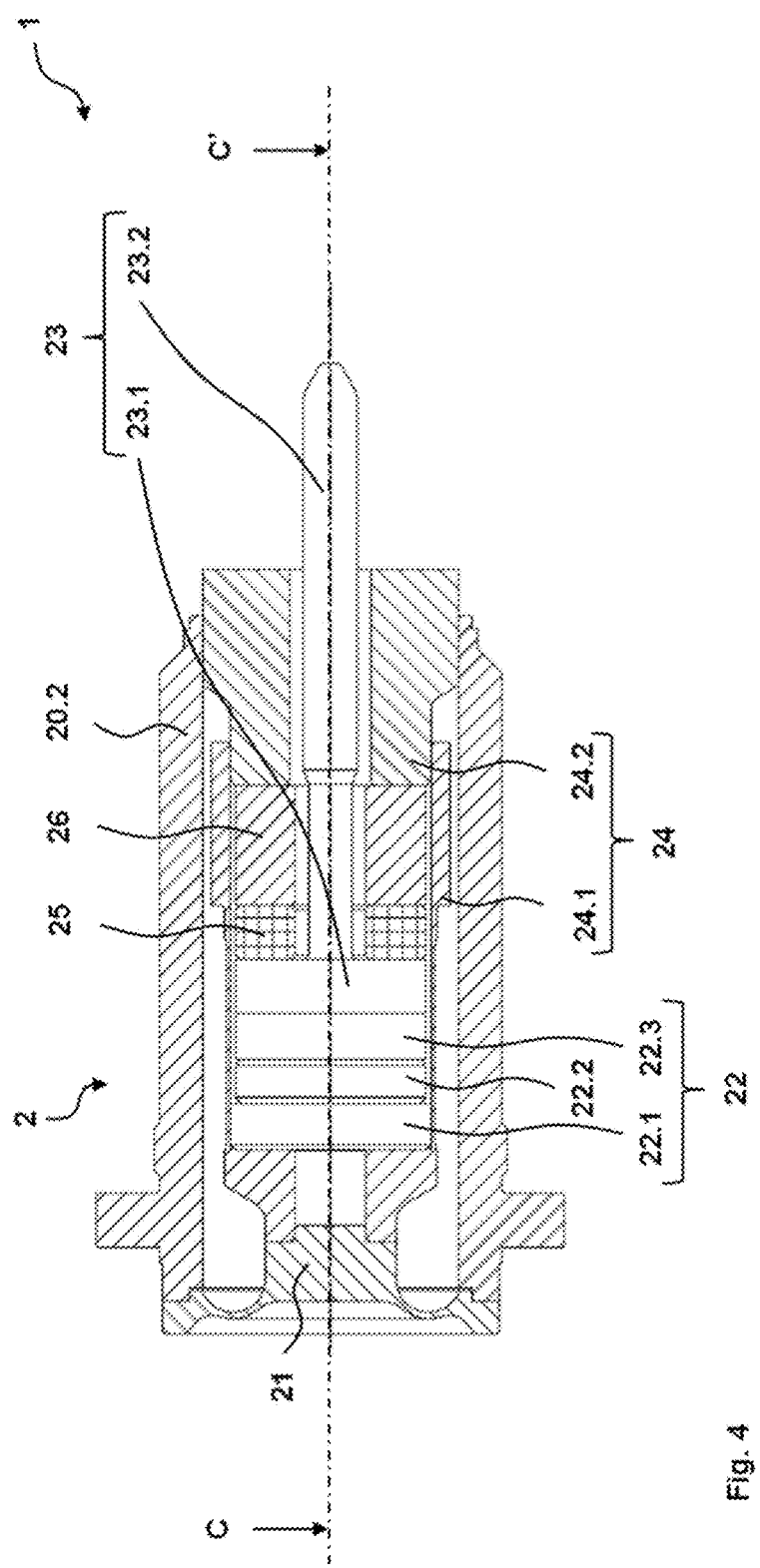
FIG. 4 shows a section C÷C' through a second embodiment of the sensor assembly according to FIG. 1 or 2.
Figure 5:
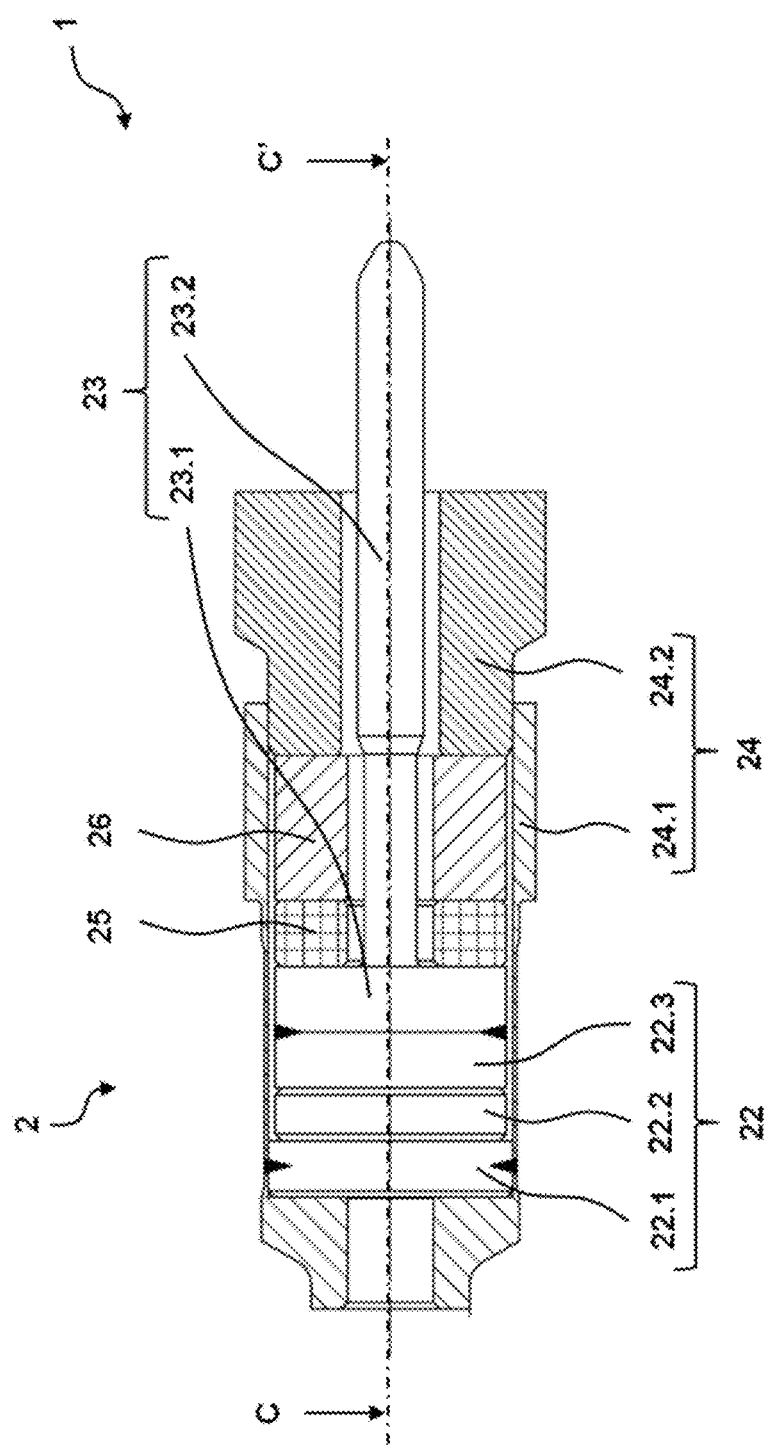
FIG. 5 shows a section C÷C' through a third embodiment of the sensor assembly according to FIG. 1 or 2.

As shown in FIGS. 3-5 for example, embodiments of the piezoelectric sensor 22 desirably can include a first support element 22.1, a piezoelectric sensor element 22.2, and a second support element 22.3. Relative to the longitudinal axis CC', the piezoelectric sensor element 22.2 is arranged between the first and second support elements 22.1 and 22.3. Via its surface, the membrane 21 is in mechanical contact with the first support element 22.1. In the embodiments of a sensor assembly 2 according to FIGS. 3 and 4, the first and second support elements 22.1, 22.3, via their surfaces, are in mechanical contact with the piezoelectric sensor element 22.2. In the embodiments of a sensor assembly 2 according to FIG. 5, the first and second support elements 22.1, 22.3 are mechanically connected to the piezoelectric sensor element 22.2. The mechanical connection is achieved by material bonding such as welding, diffusion welding, thermo compression bonding, soldering, etc. Knowing the present invention, those skilled in the art can manufacture an alternative embodiment of the sensor assembly 2 without a first support element 22.1 and without second support element 22.3. In such an alternative embodiment, the piezoelectric sensor element 22.2 is in a direct mechanical contact with the membrane 21 on the one hand and the electrode arrangement 23 on the other hand, with the latter being shown in FIG. 6 for example. The surface mechanical contacts may also be made through mechanical connections. The mechanical connections desirably are made through material bonding such as thermo compression bonding, diffusion welding, soldering, etc.

The support elements 22.1, 22.3 evenly distribute the normal force action on the piezoelectric sensor element 22.2. Support elements 22.1, 22.3 desirably are cylindrical in shape and are made of electrically conductive and mechanically rigid material such as from pure metals, nickel alloys, cobalt alloys, iron alloys, electrically conductive ceramics, ceramics with an electrically conductive coating, etc. The piezoelectric sensor element 22.2 is also cylindrical in shape and consists of piezoelectric crystal material such as quartz ($SiO_2$ monocrystal), calcium gallo-germanate ($Ca_3Ga_2Ge_4O_{14}$ or CGG), langasite ($La_3Ga_5SiO_{14}$ or LGS), tourmaline, gallium orthophosphate, etc. The crystallographic orientation in which the piezoelectric sensor element 22.2 is cut is such that it has a high sensitivity for the pressure profile to be captured. Advantageously, the piezoelectric sensor element 22.2 is oriented in such a way that the normal force affecting the membrane 21 acts on the same surfaces of the piezoelectric sensor element 22.2 that experience the changes in negative and positive electric polarization attributable to pressures affecting the membrane 21. The normal force can act onto the surface of the piezoelectric sensor element 22.2 in a loading or relieving manner. Under a mechanical load due to the normal force, negative polarization charges are generated onto one of the opposite surfaces of the piezoelectric sensor element 22.2. If the normal force has a relieving impact, negative polarization charges are drawn away from one of the opposite surfaces of the piezoelectric sensor element 22.2 and this directional migration of negative charge produces an electrical effect as if positive polarization charges are produced. The electrode arrangement 23 desirably is positioned on the longitudinal axis CC' on the side of the piezoelectric sensor 22 that faces away from the membrane 21 directly behind the piezoelectric sensor of 22. Knowing the present invention, the skilled person can of course use more than one piezoelectric sensor element 22.2.

As shown in FIGS. 3-6 for example, the electrode arrangement 23 has a cylindrically shaped charge pick-off 23.1 at the front opposite end thereof and a rod-shaped charge output 23.2 at the back opposite end thereof. The electrode arrangement 23 desirably includes an electrically conductive material such as pure metals, nickel alloys, cobalt alloys, iron alloys, etc. The charge pick-off 23.1 and the charge output 23.2 desirably may be formed as a unitary structure such as would be the case if a single metal stock was milled on a lathe to form the charge pick-off 23.1 at one end of the stock and the charge output 23.2 at the other end of the stock. Alternatively, a similar unitary element forming the charge pick-off 23.1 and the charge output 23.2 could be obtained in a single molding operation. Each of the charge pick-off 23.1 and the charge output 23.2 also may be formed integrally by mechanically connecting the charge pick-off 23.1 to the charge output 23.2 in a permanent way, which desirably can be effected by material bonding. However, any type of mechanical connection may be used such as, for example, form closure and force closure.

In any case, the charge pick-off 23.1 and the charge output 23.2 are electrically connected to each other. As shown in FIGS. 3-5 for example, negative polarization charges are received as signals from the electrode arrangement 23 via the second support element 22.3 and fed to the evaluation unit 5. As shown in FIGS. 3 and 4 for example, positive polarization charges are received via the first support element 22.1 and the membrane 21 from the grounded reinforcement casing 20.2. Knowing the present invention, those skilled in the art may use additional positive polarization charges as signals. Thus, the skilled artisan can use transmission of the positive polarization charges from ground to the evaluation unit in an electrically insulated manner. This can be achieved by forming an electrical connection by material bonding such as by crimping etc. of the sensor housing assembly to a shielding of the signal cable and by forming an electrical connection such as by crimping etc. of the electromagnetic shielding to the circuit board housing.

As shown in FIGS. 3-5 for example, the entire front surface of the charge pick-off 23.1 desirably is in electrical contact with a rear surface of the second support element 22.3 at which charges are discharged so that even under the impact of a normal force no areas are left without contact where high local electric voltages and electrical leakage currents can occur. In the embodiments of the sensor assembly 2 according to FIGS. 3 and 4 for example, the electric contact of the surface of the charge pick-off 23.1 and the second support element 22.3 is achieved by a mechanical contact of the surfaces. In the embodiment of sensor assembly 2 according to FIG. 5 for example, the surface electric contact between the charge pick-off 23.1 and the second support element 22.3 is achieved by a mechanical connection of the charge pick-off 23.1 and the second support element 22.3. Such mechanical connection desirably is effected by material bonding such as welding, diffusion welding, thermo compression bonding, soldering, etc. and is schematically represented in FIG. 5 by the darkened solid triangular shapes, which desirably could be welds for example. In the embodiment of sensor assembly 2 according to FIG. 6 for example, the charge pick-off 23.1 is made to serve the additional function of a second support element by being made integrally with the second support element 22.3, and so the charge pick-off 23.1 makes direct surface electric contact with the piezoelectric sensor element 22.2.

As shown in FIGS. 3-6 for example, the electrode arrangement 23 is electrically insulated against the reinforcement casing 20.2 by a first electric insulation body 25. A suitable first electric insulation body 25 desirably has the form of a hollow cylinder and is made of electrically insulating and mechanically rigid material such as ceramics, $Al_2O_3$ ceramics, sapphire, etc. On the longitudinal axis CC', the first electric insulation body 25 is positioned directly behind the charge pick-off 23.1 on the side of the charge pick-off 23.1 that faces away from the membrane 21. In the embodiment of the sensor assembly 2 according to FIG. 3 for example, the first electric insulation body 25 is in mechanical contact over its entire surface with the charge pick-off 23.1. In the embodiments of the sensor assembly 2 according to FIGS. 4 to 6 for example, the first electric insulation body 25 is mechanically connected to the charge pick-off-off 23.1. This mechanical connection desirably is achieved by material bonding such as welding, diffusion welding, thermo compression bonding, soldering, etc.

As shown in FIGS. 3-6 for example, a compensation element 26 desirably is provided to perform the function of compensating for different thermal expansion coefficients of the components of the piezoelectric pressure sensor 1. The compensation element 26 has the form of a hollow cylinder and is made of mechanically rigid material such as from pure metals, nickel alloys, cobalt alloys, iron alloys, ceramics, $Al_2O_3$ ceramics, sapphire, etc. The compensation element 26 is disposed along the longitudinal axis CC' and positioned directly behind the first electric insulation body 25 on the side of the first electric insulation body 25 facing away from the membrane 21. In the embodiment of sensor assembly 2 according to FIG. 3 for example, the compensation element 26 mechanically contacts the first electric insulation body 25 over its entire surface. In the embodiments of sensor assembly 2 according to FIGS. 4 to 6 for example, the compensation element 26 is mechanically connected to the first electric insulation body 25. This mechanical connection is achieved by material bonding such as welding, diffusion welding, thermo compression bonding, soldering, etc. The compensation element 26 is optional and thus may be omitted from some embodiments. Knowing the present invention, the skilled person can manufacture a piezoelectric pressure sensor without a compensation element 26, however, this situation is not shown in the Figures. Moreover, although not shown in the Figures, the compensation element 26 also may be arranged between other components of the piezoelectric pressure sensor 1. For example, the compensation element 26 may be placed between the pre-stressing sleeve 24.1 and the piezoelectric sensor 22 or between the piezoelectric sensor of 22 and the charge pick-off 23.1 or between the charge pick-off 23.1 and the first electric insulation body 25 or between the first electric insulation body 25 and the pre-stressing body 24.2. In all cases, the entire surface of the compensation element 26 may be in mechanical contact with these components of the piezoelectric pressure sensor 1.

The piezoelectric sensor 22 is mechanically pre-stressed via a pre-stressing assembly 24. As shown in FIGS. 3-6 for example, embodiments of a pre-stressing assembly 24 desirably can include a pre-stressing sleeve 24.1 and a pre-stressing body 24.2, each of them desirably having the shape of a hollow cylinder. The pre-stressing assembly 24 desirably consists of mechanically rigid material such as pure metals, nickel alloys, cobalt alloys, iron alloys, etc. The piezoelectric sensor 22 is mechanically pre-stressed between the pre-stressing body 24.2 and the pre-stressing sleeve 24.1. The pre-stressing body 24.2 is positioned along the longitudinal axis CC' on the side of charge pick-off 23.1 that faces away from the membrane 21. As shown in FIGS. 3-6 for example, the pre-stressing body 24.2 is positioned directly behind the compensation element 26. If the compensation element 26 is omitted, then the pre-stressing body 24.2 is positioned on the longitudinal axis CC' directly behind the first electric insulation body 25 on the side of charge pick-off 23.1 that faces away from the membrane 21. In the embodiment of sensor assembly 2 according to FIG. 3 for example, the compensation element 26 is in mechanical contact with the entire opposing surface of the pre-stressing body 24.2. In the embodiments of sensor assembly 2 according to FIGS. 4 to 6 for example, the compensation element 26 is mechanically connected to the pre-stressing body 24.2. The mechanical connection desirably is achieved by material bonding such as welding, diffusion welding, thermo compression bonding, soldering, etc. Thus, the charge pick-off 23.1 and the pre-stressing body 24.2 are insulated against each other by the first electric insulation body 25 that is arranged between them.

Figure 6:
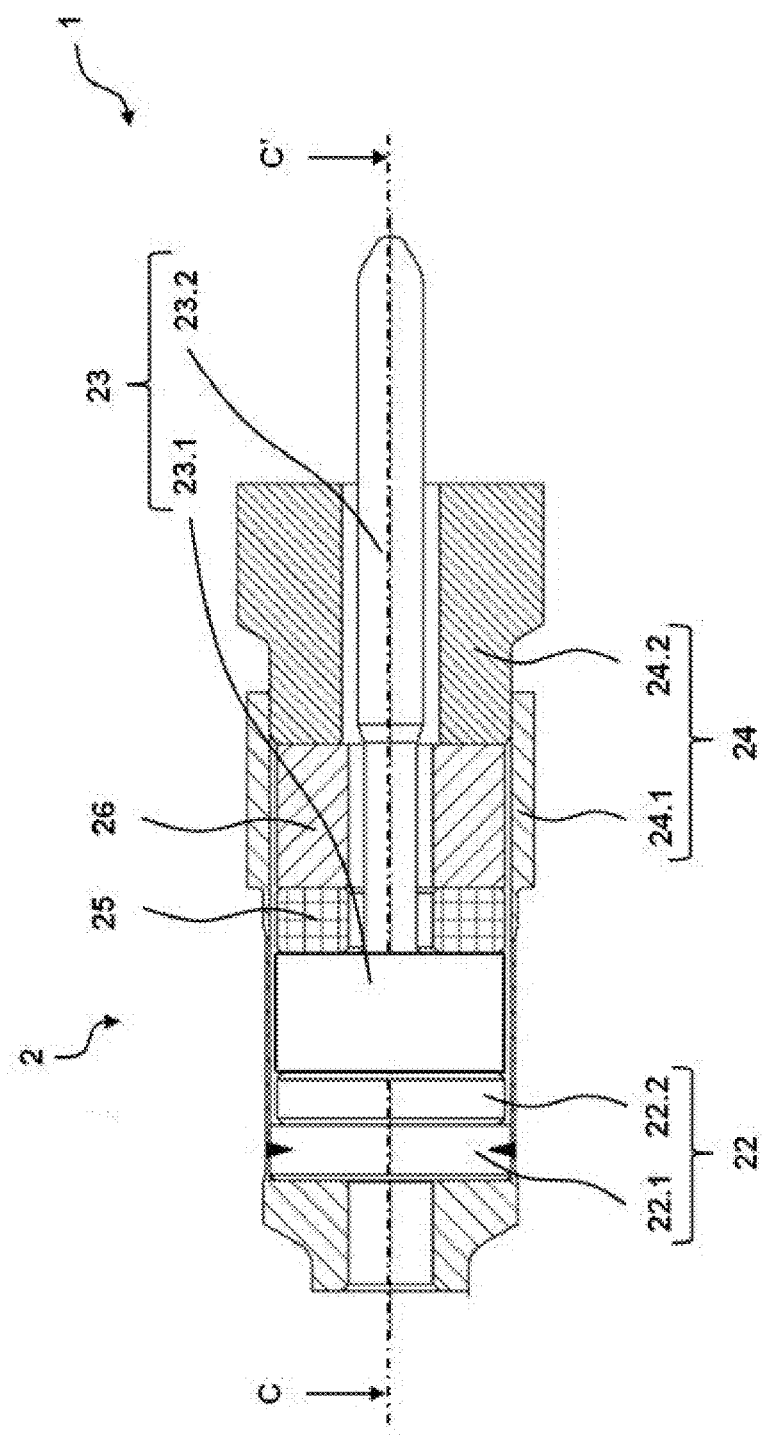
FIG. 6 shows a section C÷C' through a fourth embodiment of the sensor assembly of the piezoelectric pressure sensor according to FIG. 1 or 2.

As shown in FIGS. 3 and 4 for example, the entire externally facing perimeter of a central area of the pre-stressing body 24.2 is electrically and mechanically connected to an opposing interior surface of the reinforcement casing 20.2. An external surface of the pre-stressing body 24.2 that is radially spaced apart from the longitudinal axis CC' is electrically and mechanically connected to the opposing surface of the reinforcement casing 20.2 that is likewise radially spaced apart from the longitudinal axis CC'. This electrical and mechanical connection preferably is made by material bonding such as welding, diffusion welding, thermo compression bonding, soldering, etc. The entire annular external surface of a front edge of the pre-stressing body 24.2 desirably is mechanically connected to the opposing internally facing surface at a rear end of the pre-stressing sleeve 24.1. This mechanical connection is achieved by material bonding such as welding, diffusion welding, thermo compression bonding, soldering, etc. In the embodiments of a sensor assembly 2 according to FIGS. 5 and 6 for example, the front end of the pre-stressing sleeve 24.1 additionally is connected mechanically to an outer surface of the first support element 22.1. Such mechanical connection desirably is effected by material bonding and is schematically represented in FIGS. 5 and 6 by the darkened solid triangular shapes, which desirably could be welds. Relative to the longitudinal axis CC', the pre-stressing sleeve 24.1 is arranged radially outward of the piezoelectric sensor of 22, the first electric insulation body 25 and the compensation element 26. As shown in FIGS. 3 and 4 for example, relative to longitudinal axis CC', the pre-stressing sleeve is 24.1 arranged radially inwards of the reinforcement casing 20.2. The exterior surface of the pre-stressing sleeve 24.1 is spaced apart radially from the interior surface of the reinforcement casing 20.2 by a first gap. The interior surface of the pre-stressing sleeve 24.1 is spaced apart from the exterior surfaces of the piezoelectric sensor 22, the charge pick-off 23.1, the first electric insulation body 25 and the compensation element 26 by a second gap. The entire perimeter of the front end of the pre-stressing sleeve 24.1 is mechanically connected to a rear edge of the membrane 21. The mechanical connection desirably is made by material bonding such as welding, diffusion welding, thermo compression bonding, soldering, etc. The pre-stressing assembly 24 mechanically pre-stresses the piezoelectric sensor 22, the charge pick-off 23.1, the first electric insulation body 25 and the compensation element 26. The mechanical pre-stressing is a force-locking mechanical connection.

In the embodiment of the sensor assembly 2 according to FIG. 3 for example, the electrode arrangement 23 is electrically insulated from the reinforcement casing 20.2 by an electric feedthrough arrangement 27. The electric feedthrough arrangement 27 desirably includes a first adapter element 27.1, a second electric insulation body 27.2 and a second adapter element 27.3. The feedthrough arrangement 27 is disposed along the longitudinal axis CC' directly behind the pre-stressing body 24.2, on the side of the pre-stressing body 24.2 that faces away from the membrane 21. However, the embodiments of sensor assembly 2 according to FIGS. 4 to 6 do not have any such electric feedthrough arrangement 27.

As shown in FIG. 3 for example, the first adapter element 27.1 has the shape of a hollow cylinder and desirably consists of mechanically rigid material such as pure metals, nickel alloys, cobalt alloys, iron alloys, etc. The first adapter element 27.1 desirably is positioned along the longitudinal axis CC' directly behind the pre-stressing body 24.2, on the side of the pre-stressing body 24.2 that faces away from the membrane 21. The entire perimeter of a front edge of the first adapter element 27.1 desirably is mechanically connected to a rear end of the pre-stressing body 24.2. This mechanical connection desirably is achieved by material bonding such as welding, diffusion welding, thermo compression bonding, soldering, etc. Preferably, this material bonding is made using a pairing in which the first adapter element 27.1 is made from titanium and in which the pre-stressing body 24.2 desirably consists of an iron alloy with material number 1.4552, said pairing exhibiting small differences in thermal coefficients of linear expansion in all directions even at high temperatures while the material bonding is performed and accordingly the resulting bond will possess a relatively high mechanical stability. Preferably, with this pairing this difference is smaller than 10 ppm, preferably smaller than 5 ppm.

As shown in FIG. 3 for example, the second electric insulation body 27.2 electrically insulates the second adapter element 27.3 from the reinforcement casing 20.2. The second electric insulation body 27.2 desirably has the form of a hollow cylinder and desirably consists of electrically insulating and mechanically rigid material such as ceramics, $Al_2O_3$ ceramics, Sapphire, etc. The second electric insulation body 27.2 is positioned along the longitudinal axis CC' directly behind the first adapter element 27.1, on the side of the first adapter element 27.1 that faces away from the membrane 21. The entire perimeter of a front end of the second electric insulation body 27.2 desirably is mechanically connected to a rear edge of the first adapter element 27.1. This mechanical connection desirably is achieved by material bonding such as thermo compression bonding, diffusion welding, soldering, etc. In performing this material bonding, a pairing is preferred in which the first adapter element 27.1 is made of titanium and in which the second electric insulation body 27.2 is made from $Al_2O_3$ ceramics, which pairing exhibits small differences in thermal coefficients of linear expansion in all directions even at high temperatures while the material bonding is achieved and thus the resulting bond will exhibit a high degree of mechanical stability. Preferably, using this pairing this difference is smaller than 5 ppm, preferably smaller than 3 ppm.

As shown in FIG. 3 for example, the charge output 23.2 is electrically and mechanically connected to the second adapter element 27.3, which desirably has the form of a hollow cylinder and desirably can consist of electrically conductive material such as pure metals, nickel alloys, cobalt alloys, iron alloys, etc. The second adapter element 27.3 is positioned directly behind the second electric insulation body 27.2 along the longitudinal axis CC', on the side of the second electric insulation body 27.2 that faces away from the membrane 21. The entire perimeter of the front end of the second adapter element 27.3 desirably is mechanically connected to a rear end of the second electric insulation body 27.2. This mechanical connection desirably is achieved by material bonding such as thermo compression bonding, diffusion welding, soldering, etc. In performing the material bonding, a pairing is preferred between the second adapter element 27.3 that is made of an iron alloy with material number 1.3981 or 1.3982, and the second electric insulation body 27.2 that is made from $Al_2O_3$ ceramics since this bond pairing exhibits small differences in the thermal coefficients of linear expansion independent of the direction even at high temperatures when the material bonding is performed so that the resulting bond will have a high degree of mechanical stability. Preferably, with this pairing this difference is smaller than 5 ppm, preferably smaller than 3 ppm.

As shown in FIGS. 3-6 for example, the charge output 23.2 extends centrally along the longitudinal axis CC' through the first electric insulation body 25, the compensation element 26, the pre-stressing body 24.2 and the electric feedthrough arrangement 27 (FIG. 3). As shown in FIG. 3 for example, the charge output 23.2 is spaced apart radially with respect to each of the first electric insulation body 25, the compensation element 26, the pre-stressing body 24.2, the first adapter element 27.1 and the second electric insulation body 27.2 by a third gap that extends along the longitudinal axis CC'. Due to this spacing apart, the charge output 23.2 is electrically insulated from these components. A rear end of the second adapter element 27.3 is electrically and mechanically connected to the entire perimeter of a central area of the charge output 23.2. This mechanical connection is direct and desirably is carried out by material bonding such as welding, diffusion welding, thermo compression bonding, soldering, etc. As shown in FIG. 3 for example, a rear end of the charge output 23.2 protrudes along the longitudinal axis CC' from the second adapter element 27.3.

Knowing the present invention, those skilled in the art have a variety of possibilities to vary this embodiment. For example, the charge output 23.2 and the second adapter element 27.3 also may be integrally formed into a single element. In such an embodiment, the charge pick-off 23.1 and the charge output 23.2 desirably consist of two parts for assembly reasons because then the charge output 23.2 can be positioned in a way that it extends centrally through the first insulation element 25, the compensation element 26 and the pre-stressing body 24.2. Also, the mechanical connection between the charge output 23.2 and the second adapter element 27.3 can be made indirectly by arranging an intermediate sleeve between the charge output 23.2 and the second adapter element 27.3 and connecting it to the charge output 23.2 and the second adapter element 27.3 by means of material bonding. Also in this case, the material bonding is preferably made using pairings of intermediate sleeve and charge output 23.2 or of intermediate sleeve and second element 27.3, respectively, that exhibit small differences in the thermal coefficients of linear expansion so that the resulting bond will exhibit a high degree of mechanical stability. Preferably, the differences of these pairings are smaller than 10 ppm, preferably smaller than 5 ppm, preferably smaller than 3 ppm. Alternatively, a unitary structure can be configured so that the charge output 23.2 and the second adapter element 27.3 are formed as a single element that has been appropriately milled or molded.

As shown in FIGS. 3 and 4 for example, the electrode arrangement 23 is carried by the pre-stressing body 24.2 that is mechanically connected to the reinforcement casing 20.2.

In a first supporting area, the charge pick-off 23.1 is mechanically supported by the pre-stressing body 24.2 via the first electric insulation body 25 and the compensation element 26. In the embodiment of sensor assembly 2 according to FIG. 3, the charge pick-off 23.1, the first electric insulation body 25, the compensation element 26, and the pre-stressing body 24.2 are in mechanical contact with each other. In the embodiment of sensor assembly 2 according to FIGS. 4 to 6, the charge pick-off 23.1, the first electric insulation body 25, the compensation element 26, and the pre-stressing body 24.2 are mechanically connected to each other. At least one mechanical connection of the first supporting area is a connection by material bonding that is pressure-tight. It is quite advantageous, when all mechanical connections of the first supporting area are connections by material bonding that are pressure-tight.

In the embodiment of the sensor assembly 2 according to FIG. 3, the charge output 23.2 is mechanically supported in a second supporting area by the electric feedthrough arrangement 27 wherein the charge output 23.2, electric feedthrough arrangement 27 and the pre-stressing body 24.2 are mechanically connected to each other. At least one mechanical connection of the second supporting area is a connection made by material bonding that is pressure-tight. It is quite advantageous, when all mechanical connections of the second supporting area are connections by material bonds that are pressure-tight.

In the embodiments of sensor assembly 2 according to FIGS. 3 to 6, the charge pick-off 23.1 is mechanically supported in a third supporting area on the pre-stressing sleeve 24.1 via the piezoelectric sensor 22 wherein the charge pick-off 23.1, the piezoelectric sensor 22, the pre-stressing sleeve 24.1 and the pre-stressing body 24.2 are mechanically connected to each other. At least one mechanical connection of the third supporting area is a connection made by material bonding that is pressure-tight. It is quite advantageous, when all mechanical connections of the third supporting areas are connections by material bondings that are pressure-tight.

This multiple mechanical support provided in several supporting areas that are spaced apart from each other on the longitudinal axis CC' increases the mechanical stability of signal output. However, it is advantageous in this respect, when all mechanical connections of the sensor assembly 2 are material bonds.

If the membrane 21 ruptures, hot gases may escape from the pressure chamber into the first gap between the pre-stressing sleeve 24.1 on the one hand and the reinforcement casing 20.2 on the other hand. If the pre-stressing sleeve 24.1 is then damaged by the hot gases, then the hot gases may escape into the second gap between the pre-stressing sleeve 24.1 on the one hand and the piezoelectric sensor 22, the charge pickup 23.1, the first electric insulation body 25 and the compensation element 26 on the other hand. Since the electrode arrangement 23 is mechanically connected to the electric feedthrough arrangement 27 and the pre-stressing body 24.2 via the charge output 23.2, the electrode arrangement 23 seals the first electric insulation body 25 and the compensation element 26 in the embodiment of the sensor assembly 2 according to FIG. 3 so that that hot gases can only flow very slowly into the third gap between the charge output 23.2 on the one hand and on the other hand the first electric insulation body 25, the compensation element 26, and the pre-stressing body 24.2. This seal is intended to remain sufficiently pressure-tight to withstand the average indexed cylinder pressure of the combustion engine. The average indexed cylinder pressure is also referred to as the indexed mean pressure and is in the range of ⅓ to ⅛ of the maximum of rapid pressure profiles from 150 to 250 bar. The average indexed cylinder pressure is the pressure that occurs over time in the second gap upon rupture of the membrane 21 and damage of the pre-stressing sleeve 24.1. The mechanical surface contact between the charge pick-off 23.1 and the first electric insulation body 25 desirably seals the third gap from the second gap by means of form closure. The mechanical surface contact between the first electric insulation body 25 and the compensation element 26 desirably seals the third gap by means of form closure from the second gap. The mechanical surface contact between the compensation element 26 and the pre-stressing body 24.2 desirably seals the third gap from the second gap by means of form closure.

In embodiments that lack a compensation element 26, the electrode arrangement 23 only seals the first electric insulation body 25 so as to prevent hot gases from entering the third gap. The mechanical surface contact between the charge pick-off 23.1 and the first electric insulation body 25 desirably seals the third gap from the second gap by means of form closure. The mechanical surface contact between the first electric insulation body 25 and the pre-stressing body 24.2 desirably seals the third gap from the second gap by means of form closure. If now hot gases also destroy the first electric insulation body 25, so that it ruptures into many small fragments and hot gases enter into the third gap, then the third gap is separated in the embodiment of the sensor assembly 2 according to FIG. 3 by the second supporting area from the environment in a pressure-tight manner. In the embodiments of sensor assembly 2 according to FIGS. 4 to 6, the third gap is separated from the environment by the first supporting area in a pressure-tight manner. Thus, upon rupture of the membrane, no hot gases can escape into the environment.

Each of FIGS. 7 and 8 shows an enlarged section through a portion of the sensor assembly 2 and the signal cable assembly 4 of the ready-to-use mounted piezoelectric pressure sensor 1 according to FIG. 1 or FIG. 2. FIG. 7 is a section through the entire piezoelectric pressure sensor 1 with the vertical axis AA' serving as the sectional line A÷A'. FIG. 8 is a section through the entire piezoelectric pressure sensor 1 with the horizontal axis BB' serving as the sectional line B÷B'. FIGS. 7 and 8 show the connection element housing 40, the signal cable 41, the supporting body 42 and the electrical connecting element 43 of the signal cable assembly 4.

As shown in FIGS. 7 and 8 for example, an embodiment of the electrical connecting element 43 of the signal cable assembly 4 desirably has the form of a hollow cylinder. The electrical connecting element 43 desirably can consist of electrically conductive material such as pure metals, nickel alloys, cobalt alloys, iron alloys, etc. The charge output 23.2 is joined with the electrical connecting element 43. The rear end of charge output 23.2 shown in FIGS. 3-6 for example protrudes into the electrical connecting element 43 along the longitudinal axis CC. In this region along the longitudinal axis CC', a radially external surface of the charge output 23.2 is electrically and mechanically connected to relative to an opposing and radially internal surface of the electrical connecting element 43. The electrical and mechanical connection desirably is achieved by material bonding such as welding, diffusion welding, thermo compression bonding, soldering, crimping etc. The charge output 23.2 forms a material bond with the electrical connecting element 43 in certain areas. The material bond in certain areas can be achieved by spot welding or seam welding around the entire opposing circumferences of the charge output 23.2 and the electrical connecting element 43 in these certain areas. Knowing the present invention, the skilled artisan can of course also use a differently shaped electrical connecting element 43. Thus, the electrical connecting element 43 can have the form of a plate or of a half shell. In this case, the charge output 23.2 does not extend into the electrical connecting element 43. For making the electrical and mechanical connection, the charge output 23.2 is then placed onto the electrical connecting element 43 in the form of a plate or a half shell.

As shown in FIGS. 7 and 8 for example, an embodiment of the signal cable 41 of the signal cable assembly 4 desirably has a front end that is disposed in the supporting body 42 of the signal cable assembly 4. The supporting body 42 desirably has the form of a hollow cylinder and desirably can consist of mechanically resistant material such as pure metals, nickel alloys, cobalt alloys, iron alloys, etc. A rear area of the supporting body 42 is mechanically connected around its entire perimeter to a rear edge of the connection element housing 40. This mechanical connection desirably is achieved by material bonding such as welding, diffusion welding, thermo compression bonding, soldering, etc. As shown in FIGS. 7 and 8 for example, a front edge of the connection element housing 40 desirably is fully mechanically connected to a rear edge of the sensor housing 20 around its entire perimeter. This mechanical connection desirably is achieved by material bonding such as welding, diffusion welding, thermo compression bonding, soldering, etc.

As shown in FIG. 10 for example, a front region of the supporting body 42 includes a supporting body frame 42.1, and at least one window is defined in the supporting body frame 42.1. As shown in the view according to FIG. 10, the supporting body frame 42.1 desirably includes two struts 42.1 that are oriented to elongate in a direction that is parallel to the longitudinal axis CC' and that are spaced apart from one another in the direction that is parallel to the horizontal axis BB'. As shown in FIG. 10 for example, at least two windows are defined between the struts 42.1 so that the vertical axis AA' passes through both of these windows. Accordingly, a joining tool can be passed through the windows from the exterior of the front region of the supporting body 42 and thereby gain access to the electrical connecting element 43 that is disposed internally of the supporting body 42.

As shown in FIGS. 7 and 8 for example, the signal cable 41 desirably can include an electric signal conductor 41.1, an electric insulation element 41.2 and a signal cable sheath 41.3. An external surface of a front end of the signal cable sheath 41.3 is radially disposed relative to the longitudinal axis CC' and desirably is mechanically connected to an opposing internally disposed surface of the supporting body 42 of the signal cable assembly 4, wherein this opposing internally disposed surface of the supporting body 42 also is radially disposed relative to the longitudinal axis CC'. While mechanical connection by crimping is preferred, any mechanical connection can be used such as material bonding, form closure and force closure. The electrical signal conductor 41.1 desirably is made of electrically conductive material such as pure metals, nickel alloys, cobalt alloys, iron alloys, etc.

As shown in FIGS. 7 and 8 for example, a front end of the electrical signal conductor 41.1 and a rear end of the electrical connecting element 43 are electrically and mechanically connected to each other. Any electrical and mechanical connection can be used such as material bonding, form closure and force closure. The electric insulation element 41.2 has the form of a hollow cylinder and desirably consists of electrically insulating material that is thermally stable up to temperatures of at least 200° C. such as polytetrafluoroethylene, polyimide, hexafluoropropylene vinylidenefluoride copolymer (FKM), etc. The electric insulation element 41.2 completely surrounds the connecting region between the electrical connecting element 43 and the electrical signal conductor 41.1 and completely surrounds the electrical signal conductor 41.1. The electric insulation element 41.2 electrically insulates the supporting body 42 from the electrical connecting element 43 and the electrical signal conductor 41.1. The electric insulation element 41.2 also absorbs motor vibrations.

Figure 9:
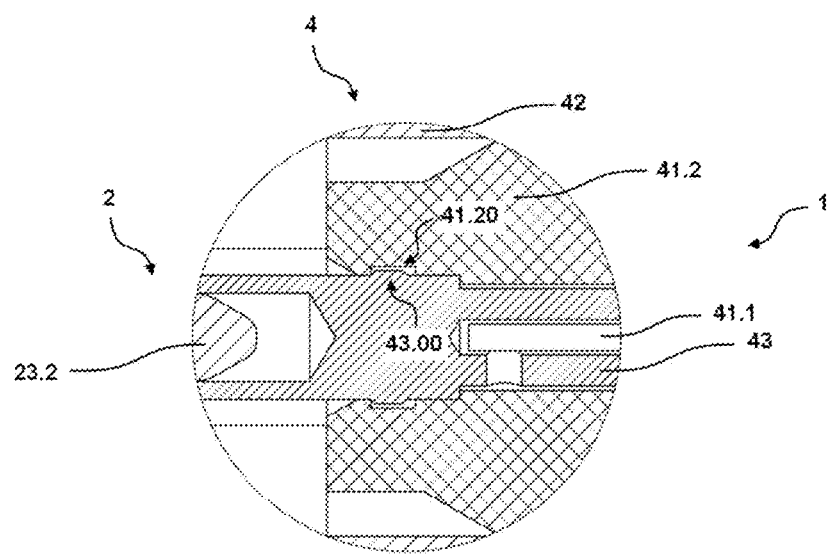
FIG. 9 shows an enlarged cross-sectional detail view of a portion of the piezoelectric pressure sensor according to FIGS. 7 and 8.

FIG. 9 shows in a cross-sectional view, a detail of the sensor assembly 2 and the signal cable assembly 4 of the piezoelectric pressure sensor 1 according to embodiments as depicted in FIG. 7 or FIG. 8. The electrical connecting element 43 includes a first locking element 43.00 that projects radially with respect to the longitudinal axis on an external surface, which accordingly for example can take on the form of a radially protruding projection 43.00. Accordingly, the electric insulation element 41.2 desirably includes a second locking element 41.20 that is defined on an inner surface and which for example has the form of groove 41.20. The first locking element 43.00 and the second locking element 41.20 form a form closure (or a contact closure) that is configured to permit between them a certain degree of play, which is relative movement in the longitudinal direction. The first locking element 43.00 and the second locking element 41.20 are configured so that the form closure or contact closure is effected automatically when the electrical connecting element 43 is pushed into the electric insulation element 41.2. According to embodiments as depicted in FIG. 7 or FIG. 8 for example, the groove extends obliquely to the longitudinal axis CC'. The groove 41.20 and mating projection 43.00 are formed matching each other, and the projection 43.00 desirably extends in the radial direction into the groove 41.20.

The play between the groove 41.20 and mating projection 43.00 serves to prevent transmission of engine vibrations from the electric signal conductor 41.1 to the charge output 23.2. Otherwise, the engine vibrations transmitted may act on the piezoelectric sensor element 22.2 and produce electric polarization charges whereby the detection of the pressure profile may be distorted. The play between them desirably is larger than 5 µm. Accordingly, the play allows small relative movements between the electrical connecting element 43 and the electric insulation element 41.2. Knowing the present invention, the skilled person can of course implement other types of locking elements. For example, the first locking element can be a groove that is configured to receive a second locking element that can be a projection.

As shown in FIGS. 7 and 8 for example, the electrical signal conductor 41.1 and the electric insulation element 41.2 extend parallel to the signal cable sheath 41.3 in the longitudinal direction CC'. The signal cable sheath 41.3 protects the electrical signal conductor 41.1 and the electric insulation element 41.2 from harmful environmental influences such as contaminations (dust, moisture, etc.). The signal cable 41 desirably may have a coaxial electromagnetic shielding and may protect the signal conductor 41.1 from electrical and electromagnetic interference effects in the form of electromagnetic radiation, thereby allowing an electromagnetic compatibility of the piezoelectric pressure sensor 1. The signal cable 41 may have a length ranging from several centimeters through and including a length of several meters.

However, in some embodiments, the signal cable assembly 4 may also be completely omitted, so that the sensor assembly 2 is electrically and mechanically connected directly to the evaluation unit 5 (FIGS. 1 and 2). In such embodiments, the charge output 23.2 is connected to the electrical connecting element 53 of the evaluation unit 5, desirably by means of material bonding. The sensor housing 20.1 is then formed integrally with the supporting body 52 of the evaluation unit 5. In the latter case, the circuit board housing 50 is mechanically connected to the sensor housing 20.1 instead of to the connection element housing 40. This embodiment many then exhibit the features of the description relating to the embodiment depicted in FIG. 10 so that the supporting body 52 of evaluation unit 5 includes a supporting body frame with at least one window through which window the electrical connecting element 43 is accessible from the outside with a joining tool. In this case, this embodiment also may include the features of the description relating to the embodiment depicted in FIG. 9 but where a first locking element of the support sleeve 52 of the evaluation unit 5 may form a form closure or contact closure with play with a second locking element of an electric insulation element of evaluation unit 5.

As shown in FIGS. 1 and 2 for example, a rear end of the signal cable 41 is electrically and mechanically connected to the evaluation unit 5. For this purpose, the evaluation unit 5 desirably includes a supporting body 52 that desirably has the form of a hollow cylinder and desirably consists of mechanically resistant material such as stainless steel, steel alloys, etc. As shown in FIGS. 1 and 2 for example, the entire perimeter of a rear edge of the supporting body 52 desirably is mechanically connected to a front edge of the circuit board housing 50. This mechanical connection desirably is achieved by material bonding such as welding, diffusion welding, thermo compression bonding, soldering, etc. As shown in FIGS. 7 and 8 for example, an external surface extending along the longitudinal axis CC' of a rear end of the signal cable sheath 41.3 is mechanically connected in certain areas to an opposing internal of the supporting body 52 of the evaluation unit 5. While crimping is preferred for this connection between the signal cable sheath 41.3 and of the supporting body 52, any mechanical connection can be used such as material bonding, form closure and force closure.

A rear end of the electrical signal wire 41.1 of the signal cable 41 (FIGS. 7 and 8 for example) is electrically and mechanically connected to the electric signal conductor 51.1 of the circuit board 51 via the electrical connecting element 53 (FIGS. 1 and 2 for example). Any electrical and mechanical connection can be used such as material bonding, form closure and force closure. As shown in FIGS. 1 and 2 for example, the electrical connecting element 53 and the electric signal conductor 51.1 desirably may be formed integrally. Signals received by the electrode arrangement 23 are transmitted via the charge output 23.2 to the electrical connecting element 43 of the signal cable assembly 4 and transmitted from the electrical connecting element 43 of the signal cable assembly 4 via the electrical signal conductor 41.1 of the signal cable 41 and the electrical connecting element 53 to the electric signal connector 51.1 of the circuit board 51 and there, they are electrically amplified and evaluated. The signals are proportional to the amount of the pressure profile captured by the membrane 21. Of course, the circuit board 51 and the electrical signal conductor 41.1 of the circuit board 51 may be components of the signal cable assembly.

FIGS. 11 and 12 show steps in the process of manufacturing an exemplary embodiment of the piezoelectric pressure sensor 1. The embodiment of the sensor assembly 2 according to FIG. 3 and the signal cable assembly 4 are manufactured separately as separate semi-finished products. This manufacturing technique has the advantage that variations of the sensor assembly 2 may be produced with variations of the signal cable assembly 4 or directly with the evaluation unit 5 to form a piezoelectric pressure sensor 1 for which the production is cost-effective. Some of the potential variations of the sensor assembly 2 include membranes 21 with different membrane thicknesses and/or piezoelectric sensors 22 with different operating temperature ranges. Some of the potential variations of the signal cable assembly 4 include signal cables 41 with different lengths and/or signal cables with or without electromagnetic shielding and/or very short signal cables 41. As another potential variation, the sensor assembly 2 may be directly mechanically and electrically connected to the evaluation unit 5 without having a signal cable assembly 4.

As shown in FIGS. 7 and 8 for example, the sensor assembly 2 desirably includes the membrane 21 accommodated in the sensor housing assembly 20, the piezoelectric sensor 22, the electrode arrangement 23, the pre-stressing assembly 24, the electric feedthrough arrangement 27 and the reinforcement casing 20.2. As shown in FIG. 3 for example, the sensor assembly 2 desirably also can include the first electric insulation body 25 and the compensation element 26. As shown in FIGS. 1 and 2 for example, the signal cable assembly 4 desirably includes the connection element housing 40, the signal cable 41, the supporting body 42 and the electrical connecting element 43. In the supporting body 42, the electrical connecting element 43 and the front end of the signal cable 41 are accommodated. As shown in FIGS. 7 and 8 for example, the connection element housing 40 is pushed over the supporting body 42 along the longitudinal axis CC' until it abuts with a connection element housing ledge 40.1 and comes into mechanical contact externally on a rear end of the supporting body 42. In the view according to FIG. 11, the rear area of the supporting body 42, thus, is obscured by the connection element housing 40 while the front area of the supporting body 42 with the supporting body frame 42.1 is visible and accessible from the outside.

In a first step of the manufacturing process, the rear end of the charge output 23.2 is pushed along the longitudinal axis CC' into the electrical connecting element 43 so that the rear end of the charge output 23.2 protrudes into the electrical connecting element 43 and the radially outer surface of the charge output 23.2 along the longitudinal axis CC' and the opposing radially inner surface of the electrical connecting element 43 are in mechanical contact to each other in certain areas along the longitudinal axis CC'.

In a further step of the manufacturing process, the really outer surface of the charge output 23.2 and the opposing radially inner surface of the electrical connecting element 43 are electrically and mechanically connected to each other in certain areas along the longitudinal axis CC'. The electrical and mechanical connection desirably is achieved by material bonding such as welding, diffusion welding, thermo compression bonding, soldering, etc. For this purpose, a joining tool can be passed through the window of the supporting body frame 42.1 in order to achieve the material bond between the charge output 23.2 and the electrical connecting element 43. While the joining tool is not represented in FIG. 11, the joining tool desirably may include electrodes of an electrical resistance welding system. However, the joining tool desirably also may be a crimping tool, a laser, etc.

In yet another step of the manufacturing process, the connection element housing 40 is displaced on the longitudinal axis CC' with respect to the sensor housing 20 so that as shown in FIGS. 7 and 8 the front edge of the connection element housing 40 is in mechanical contact with the rear edge of the sensor housing 20 and is accessible from the outside. This displacement of the connection element housing 40 is represented schematically in FIG. 12 by an arrow pointing in a direction that is parallel to the longitudinal axis CC'. As shown in FIGS. 7 and 8, in this way the rear area of the supporting body 42 is largely flush with the rear edge of the connection element case 40 and accessible from the outside while the front area of the supporting body 42 is covered by the supporting body frame 42.1.

Now, in another manufacturing process step, the connection element housing 40 is connected to the sensor housing 20.1 in certain areas as shown in FIG. 12 for example. Preferably, the front edge of the connection element housing 40 and the rear edge of the sensor housing 20.1 are mechanically connected around their entire perimeters. The mechanical connection desirably is achieved by material bonding such as welding, diffusion welding, thermo compression bonding, soldering, etc. Although not explicitly depicted in FIG. 12, a joining tool desirably is used to make the material bond between the front edge of the connection element housing 40 and the rear edge of the sensor housing 20.1.

In yet a further step of the manufacturing process, the supporting body 42 is mechanically connected to the connection element housing 40 in certain areas. Preferably, as shown in FIGS. 7 and 8 for example, an annular external surface of the rear area of the supporting body 42 is mechanically connected to an opposing annular internal surface of the rear edge of the connection element housing 40. This mechanical connection desirably is achieved by material bonding such as welding, diffusion welding, thermo compression bonding, soldering, etc. For this purpose, though not explicitly represented in FIG. 12, a joining tool desirably is used to make the material bond between the rear area of the supporting body 42 and the rear edge of the connection element housing 40.

Those skilled in the art being aware of the present invention can combine the different embodiments. Thus for example, the embodiment of the sensor assembly according to FIG. 3 can be combined with that of FIG. 4 and/or FIG. 5 or FIG. 6. Moreover, the skilled artisan can implement a piezoelectric pressure sensor in which all components that are directly involved in transmission of the signals of the piezoelectric pressure sensor are connected by material bonding. In addition, a piezoelectric pressure sensor can be implemented in which all mechanical connections between its constituent parts are material bonds. Furthermore, a piezoelectric pressure sensor can be implemented in which the charge output is directly connected to the electrical circuit board by means of material bonding.

LIST OF REFERENCE NUMERALS

AA' vertical axis
A÷A' sectional line
BB' horizontal axis
B÷B' sectional line
CC' longitudinal axis
1 piezoelectric pressure sensor
2 sensor assembly
4 signal cable assembly
5 evaluation unit
20 sensor housing assembly
20.1 sensor housing
20.2 reinforcement sleeve
21 membrane
22 piezoelectric sensor
22.1 first support element
22.2 piezoelectric sensor element
22.3 second support element
23 electrode arrangement
23.1 charge pick-off
23.2 charge output
24 pre-stressing assembly
24.1 pre-stressing sleeve
24.2 pre-stressing body
25 first electric insulation body
26 compensation element
27 electric feedthrough arrangement
27.1 first adapter element
27.2 second electric insulation body
27.3 second adapter element
40 connection element housing
40.1 connection element housing ledge
41 signal cable
41.1 electrical signal conductor
41.2 electrical insulator element
41.20 second locking element
41.3 signal cable sheath
42 supporting body
42.1 supporting body frame 43 electrical connecting element
43.00 first locking element
50 circuit board housing
51 electric circuit board
51.1 electrical signal conductor
52 supporting body
53 electrical connecting element

What is claimed is:

1. A piezoelectric pressure sensor comprising:
a membrane that captures a pressure profile;
a piezoelectric sensor on which polarization charges are generated, the piezoelectric sensor being disposed with respect to the membrane so as to generate polarization charges by the pressure profile captured by the membrane;
an electrode arrangement having a charge output connected to the piezoelectric sensor for receiving and transmitting the polarization charges as signals generated from the piezoelectric sensor;
an electrical signal conductor; and
an electrical connecting element electrically and mechanically connected to the electrical signal conductor and the charge output; and
wherein the charge output is connected in certain areas by material bonding to the electrical connecting element for transmitting signals through the electrical connecting element into the electrical signal conductor.

2. The piezoelectric pressure sensor according to claim 1, wherein:
a rear end of the charge output protrudes into the electrical connecting element (43, 53); and
an external surface of the rear end of the charge output that protrudes into the electrical connecting element is connected to an internal surface of the electrical connecting element by material bonding.

3. The piezoelectric pressure sensor according to claim 1, wherein:
the piezoelectric pressure sensor includes a pre-stressing body that mechanically pre-stresses the piezoelectric sensor;
the electrode arrangement includes a charge pick-off and;
the pre-stressing body is arranged on a side of the charge pick-off that faces away from the membrane.

4. The piezoelectric pressure sensor according to claim 3, further comprising a first electric insulation body arranged between the charge pick-off and the pre-stressing body and electrically insulating the charge pick-off from the pre-stressing body.

5. The piezoelectric pressure sensor according to claim 4, further comprising an electric feedthrough arrangement mechanically connected to the pre-stressing body; wherein:
the charge output is mechanically supported on the electric feedthrough arrangement on the side of the pre-stressing body that faces away from the membrane;
the charge output is electrically and mechanically connected to the charge pick-off;
the charge output is arranged on the side of the charge pick-off that faces away from the membrane; and
the charge output extends through the first electric insulation body and the pre-stressing body and is spaced apart from the first electric insulation body and the pre-stressing body by a gap.

6. The piezoelectric pressure sensor according to claim 5, further comprising a compensation element wherein:

the first electric insulation body is mechanically contacting the charge pick-off and the compensation element, which is mechanically contacting the pre-stressing body;
in a first supporting area the electrode arrangement is mechanically supported via the charge pick-off;
the electric feedthrough arrangement is mechanically connected to the pre-stressing body and the charge output; and
in a second supporting area the electrode arrangement is supported via the charge output.

7. The piezoelectric pressure sensor according to claim 5, wherein:
the electric feedthrough arrangement has a first adapter element, a second electric insulation body and a second adapter element;
the charge output is electrically and mechanically connected to the second adapter element; and
the second electric insulation body is arranged between the charge output and the pre-stressing body and electrically insulates the charge output from the pre-stressing body.

8. The piezoelectric pressure sensor according to claim 3, further comprising a first electric insulation body and a compensation element; wherein:
in a first supporting area the electrode arrangement is mechanically supported via the charge pick-off; and
the first electric insulation body is mechanically connected to the charge pick-off and the compensation element, which is mechanically connected to the pre-stressing body.

9. The piezoelectric pressure sensor according to claim 8, further comprising a pre-stressing sleeve wherein:
the charge pick-off, the piezoelectric sensor, the pre-stressing sleeve and the pre-stressing body are mechanically connected to each other; and
in a third supporting area the electrode arrangement is supported via the charge pick-off.

10. The piezoelectric pressure sensor according to claim 9, wherein:
the piezoelectric sensor includes a piezoelectric element and a second support element that is disposed between the piezoelectric element and the charge pick-off;
the second support element is arranged on a side of the piezoelectric element that faces away from the membrane; and
material bonding connects the second support element to the piezoelectric element and to the charge pick-off.

11. The piezoelectric pressure sensor according to claim 10, wherein:
the piezoelectric sensor includes a first support element that is arranged on a side of the piezoelectric element that faces away from the membrane; and
material bonding connects the piezoelectric element to the first support element and to the pre-stressing sleeve.

12. The piezoelectric pressure sensor according to claim 1, further comprising an electric insulation element defining an inner surface having a second locking element, wherein:
the electrical connecting element includes an outer surface that defines a first locking element which protrudes into the second locking element on the inner surface of the electric insulation element; and
the first locking element (43.00) and the second locking element are formed matching each other with play and form one of a form closure and a contact closure.

13. A process for manufacturing a piezoelectric pressure sensor, comprising the steps of:

providing a sensor assembly as a semi-finished product that includes a membrane, a piezoelectric sensor and an electrode arrangement with a charge output; and using a material bond to connect certain areas of the charge output to an electrical connecting element of one of a sensor cable assembly and an evaluation unit.

14. The process according to claim 13, wherein the charge output is connected to an electrical connecting element of a signal cable assembly that includes a supporting body having a supporting body frame in which is arranged the electrical connecting element, which is accessible from the outside through at least one window in the supporting body frame, the process further comprising the steps of:

passing a joint tool through the window in the supporting body frame and using the joint tool to produce the material bond between the charge output and the electrical connecting element.

15. The process according to claim 14, wherein the sensor assembly includes a sensor housing in which is arranged wherein the charge output that is connected to an electrical connecting element of a signal cable assembly that includes a connection element casing having a supporting body frame in which is arranged the electrical connecting element, which is accessible from the outside through at least one window in the supporting body frame, the process further comprising the step of:

after the material bond has been made between the charge output and the electrical connecting element, then displacing the connection element casing with respect to the sensor housing so that the connection element casing is pushed over the supporting body so that the supporting body frame is no longer accessible from the outside.

* * * * *